United States Patent
Caule et al.

(10) Patent No.: US 9,051,058 B2
(45) Date of Patent: Jun. 9, 2015

(54) DETECTION OF AIRCRAFT DESCENT ANOMALY

(71) Applicants: Airbus Operations (SAS), Toulouse (FR); Airbus SAS, Blagnac (FR)

(72) Inventors: Nicolas Caule, Toulouse (FR); Jacques Rosay, Toulouse (FR); Patrice Rouquette, Pompertuzat (FR); Emmanuel Cortet, Daux (FR); Francois Melin, Iteuil (FR); Pascale Louise, Toulouse (FR); Sylvain Devineau, Toulouse (FR)

(73) Assignees: Airbus Operations (SAS), Toulouse (FR); Airbus SAS, Blagnac (FR)

( * ) Notice: Subject to any disclaimer, the term of this patent is extended or adjusted under 35 U.S.C. 154(b) by 136 days.

(21) Appl. No.: 13/768,463

(22) Filed: Feb. 15, 2013

(65) Prior Publication Data

US 2013/0211632 A1   Aug. 15, 2013

(30) Foreign Application Priority Data

Feb. 15, 2012   (FR) ...................................... 12 51399

(51) Int. Cl.
| | |
|---|---|
| B64D 45/00 | (2006.01) |
| G01C 5/00 | (2006.01) |
| G05D 1/06 | (2006.01) |
| G05D 1/00 | (2006.01) |

(52) U.S. Cl.
CPC ............... *B64D 45/00* (2013.01); *G01C 5/005* (2013.01); *G05D 1/0676* (2013.01); *G05D 1/0061* (2013.01)

(58) Field of Classification Search
CPC ...... B64D 45/00; G01C 5/005; G05D 1/0061; G05D 1/0676
See application file for complete search history.

(56) References Cited

U.S. PATENT DOCUMENTS

| | | | |
|---|---|---|---|
| 8,768,556 B2 * | 7/2014 | Ben-Arie et al. ............... | 701/25 |
| 2007/0050101 A1 * | 3/2007 | Sacle et al. ..................... | 701/11 |

FOREIGN PATENT DOCUMENTS

FR   2416837   9/1979

OTHER PUBLICATIONS

French Search Report, Oct. 29, 2012.

* cited by examiner

*Primary Examiner* — John Q Nguyen
*Assistant Examiner* — Alan D Hutchinson
(74) *Attorney, Agent, or Firm* — Greer, Burns & Crain, Ltd.

(57) ABSTRACT

An aircraft ground or sea approach anomaly detection method. The method includes the steps of characterizing a flight phase of the aircraft, determining a prohibited flight envelope, defining a set of prohibited vertical speeds of the aircraft for given altitudes in relation to the ground or the sea, as a function of the flight phase of the aircraft characterized, and detecting a ground approach anomaly of the aircraft as a function of a current vertical speed and altitude in relation to the ground or the sea of the aircraft, in relation to the prohibited flight envelope determined.

9 Claims, 5 Drawing Sheets

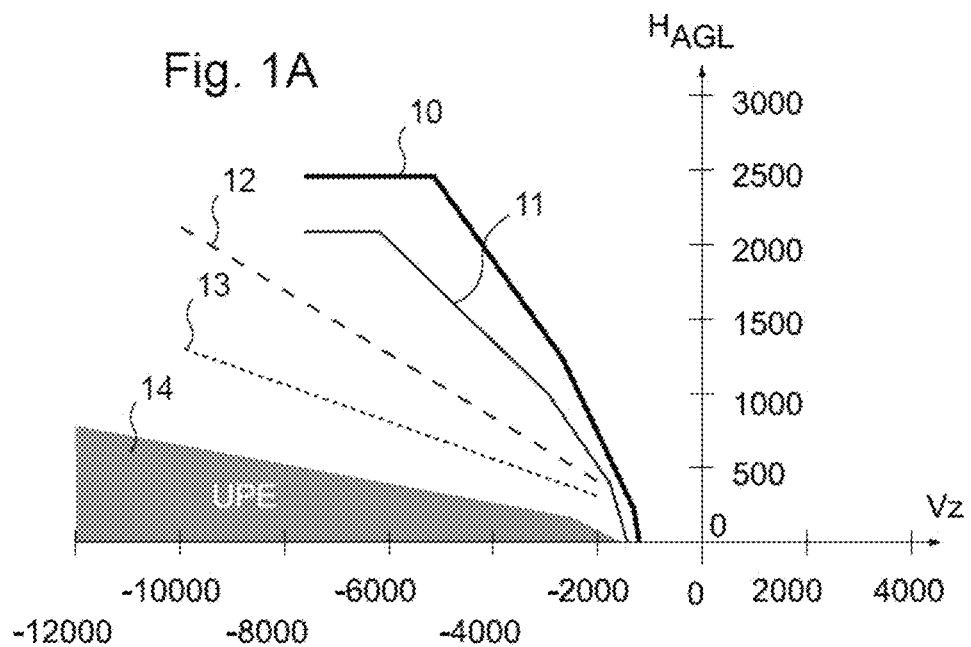
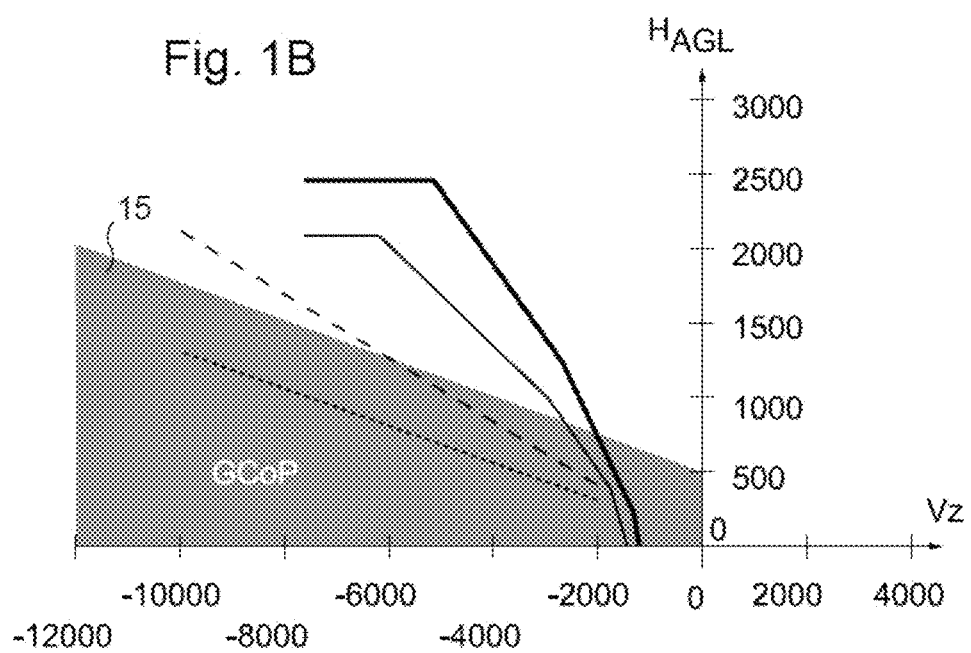

DETECTION OF AIRCRAFT DESCENT ANOMALY

CROSS-REFERENCES TO RELATED APPLICATIONS

This application claims the benefit of the French patent application No. 1251399 filed on Feb. 15, 2012, the entire disclosures of which are incorporated herein by way of reference.

BACKGROUND OF THE INVENTION

The present invention relates to the detection of aircraft descent anomaly.

Collision risk warning systems in the event of an aircraft approaching the ground dangerously exist.

For example, the following systems are known:
TAWS (Terrain Awareness and Warning System),
EGPWS (Enhanced Ground Proximity Warning System) or also
GCAS (Ground Collision Avoidance System).

These systems generate warnings (audible and/or visual) intended for the crew of the aircraft, on the basis of collision warning algorithms that can be "reactive" or "predictive".

SUMMARY OF THE INVENTION

In the first type of algorithm, the warnings are triggered mainly as a function of information provided by measuring circuits in the aircraft, for example as a function of information provided by a radio altimeter. In the second type of algorithm, the triggering of the warning is based on information contained in one or more databases (for example terrain, obstacle, airport runway or other databases) and geographic positioning equipment on the aircraft (for example GPS, or Global Positioning System, equipment).

When a warning is triggered relating to a collision with the terrain over which the aircraft is flying, the crew must very quickly analyze the situation, make a decision and take action to bring the nose of the aircraft up, correct its vertical speed and, if applicable, level the wings or correct the aircraft's path.

In emergency situations, the crew might not take the warning into account due to spatial disorientation, leading them to continue with erroneous actions and putting the aircraft in danger.

In response to this problem, document FR 2 956 512 discloses an automatic protection method for an aircraft that prevents the aircraft from entering a dangerous flight position.

The vertical speed and altitude of the aircraft are thus monitored and in the event of an excessive descent rate for a given altitude, protection orders to control the control surfaces of the aircraft are applied in order to return to a less dangerous situation.

The present invention falls within the scope of the solution provided in the aforementioned document.

Thus, a first aspect of the invention relates to a method for the detection of aircraft descent anomaly, comprising the following steps of:
characterizing a flight phase of the aircraft,
determining a prohibited flight envelope, defining a set of prohibited vertical speeds of the aircraft for given altitudes, as a function of the flight phase of the aircraft characterized, and
detecting a descent anomaly of the aircraft as a function of a current vertical speed and altitude of the aircraft, in relation to the prohibited flight envelope determined.

A flight phase may be characterized in relation to the danger for the aircraft, for example a vertical speed that is too high for an altitude that is too low, or a throttle lever held in a maximum thrust position when the aircraft is in the ground approach or other phase.

An aircraft descent may be defined as an approach towards the ground, the sea or a body of water.

A descent anomaly may be understood as an approach (towards the ground, the sea or other) that does not resemble a landing.

The method is used to detect descent anomalies accurately, particularly so that effective counter-measures may be taken early enough.

The use of a prohibited flight envelope, selected as a function of the aircraft's flight circumstances (or flight phase) makes such accurate detection possible.

For example, characterizing the flight phase of the aircraft comprises:
detecting a position of a throttle lever of the aircraft,
determining the variation in a thrust parameter of the aircraft,
comparing the current speed of the aircraft with a minimum speed control threshold, and/or
detecting the absence of a landing runway near the aircraft.

These "conditions" allow for timely detection.

For example, the detection of a ground or sea approach anomaly by the aircraft is dependent on an authorization to reduce the altitude of the aircraft in relation to the ground or the sea.

Such authorization makes it possible to introduce a degree of flexibility into detection. For example, the crew might be given the time and opportunity to react before anomaly detection is triggered.

The prohibited flight envelope determined may for example correspond to an envelope, the area of which in terms of aircraft vertical speed-altitude is larger than that of a nominal prohibited flight envelope.

Thus, the detection method may supplement collision detection methods already installed on aircraft. Such a supplementary method may make it possible to increase safety and introduce stages of detection and taking measures to protect the aircraft.

The method may also comprise, if an anomaly is detected, a step of generating an aircraft protection order in response to the anomaly detected.

It is thus possible to react automatically to the anomaly detected.

The method may also comprise a step of applying the protection order generated.

The order generated may not be applied systematically. This may make it possible to give the crew time to react itself, or to select the most appropriate order if there are several aircraft protection systems.

The protection order applies for example to control surfaces of the aircraft.

Said control surfaces are for example the wings, the ailerons of the vehicle or any other surface capable of braking or even stopping the descent of the vehicle.

The method may also comprise a step of deciding whether to apply the protection order generated.

This decision-making step may comprise the selection of the aforementioned order to be applied.

For example, the decision-making step comprises the selection of an order from at least one generated protection order and an attitude control order issued by an attitude control component of the aircraft.

The method may also comprise a step of inhibiting the application of the order generated as a function of the flight phase of the aircraft determined.

This inhibition may for example be implemented in the event of equipment failures that may lead to the aircraft flight phase being incorrectly assessed.

A second aspect of the invention relates to a system for implementing a method according to the first aspect.

Such a system comprises a processing unit configured to characterize a flight phase of the aircraft, determine a prohibited flight envelope, defining a set of prohibited vertical speeds of the aircraft for given altitudes in relation to the ground or the sea, as a function of the flight phase of the aircraft characterized, and detect an aircraft ground approach anomaly as a function of a current vertical speed and altitude in relation to the ground or the sea of the aircraft, in relation to the prohibited flight envelope determined.

A third aspect of the invention relates to an aircraft comprising a system according to the second aspect, for example an airplane.

A fourth aspect of the invention relates to a computer program together with a computer program product and a storage medium for such programs and product, enabling the implementation of a method according to the first aspect when the program is loaded and run by an aircraft ground or sea approach anomaly detection system.

The subject-matters according to the second, third and fourth aspects of the invention procure at least the same advantages as those procured by the method according to the first aspect. The subject-matters according to the second and third aspects may comprise components configured to implement steps corresponding to optional features of the method according to the first aspect.

BRIEF DESCRIPTION OF THE DRAWINGS

Further features and advantages of the invention will become apparent on reading the following detailed description, given as a non-limitative example, and the attached figures, in which:

FIGS. 1A and 1B show prohibited flight envelopes;

DETAILED DESCRIPTION OF THE PREFERRED EMBODIMENTS

Figure 2:
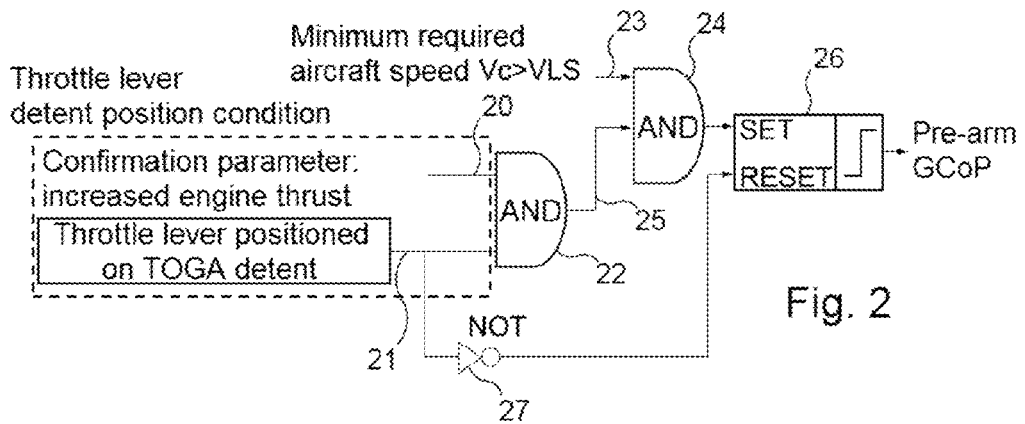
FIGS. 2 to 7 show arming conditions of GCoP mode.

In the following description, reference is made to a first automatic aircraft protection mode against a risk of collision with the ground or the sea, known as GCoP (Ground Collision Protection).

Reference is also made to a second protection mode known as UPE (Ultimate Protected Envelope).

For example, UPE mode is the default operating mode. It applies when GCoP mode is inactive.

Reference is made below to a descent towards the ground or an altitude in relation to the ground only. However, the present invention can apply in the detection of an abnormal approach towards the sea or a body of water if the aircraft is flying over such stretches of water.

In UPE mode, a nominal prohibited flight envelope is used. It defines vertical speed-altitude pairs that reflect an excessive descent rate not authorized for the aircraft (generally a high vertical speed towards the ground or sea for a low altitude). It is considered that, when the current vertical speed-altitude pair of the aircraft enters said envelope, the risk of collision with the ground or sea is probable, unless immediate, highly authoritative corrective action is taken.

The prohibited flight envelope may be determined on the basis of the technical characteristics and structure of the aircraft.

When the aircraft is within the prohibited flight envelope, protection orders may be generated. The purpose of said orders is in particular to control the control surfaces of the aircraft that act on its vertical speed. Said protection orders may be such that, when they are applied to said control surfaces, the aircraft exits the prohibited flight envelope.

In UPE mode, the excessive descent rate of the aircraft may be reduced while still making it possible for the crew to maneuver the aircraft (for example an airplane). The aim is to prevent the aircraft, as far as possible, from reaching vertical speeds when it is close to the ground such that the crew can no longer rectify the situation given the capabilities of the aircraft. In other words, in UPE mode, measures are taken to avoid placing the aircraft in a situation that is difficult for the crew to rectify and might end in a collision with the ground.

In GCoP mode, which can be seen as an extension of UPE mode, the aim is to characterize a non-operational, critical situation that might lead to a CFIT (Controlled Flight Into Terrain, which is a collision with the ground resulting from neither a failure nor loss of control of the aircraft), in such a way as to apply a more restrictive prohibited flight envelope than in UPE mode that makes it possible to avoid a collision with the ground, particularly when the terrain is flat.

This envelope which is more restrictive than the UPE mode envelope may be qualified hereinafter as the "conditional prohibited" envelope. This qualification can be understood in that the vertical speed-altitude pairs of said envelope are prohibited if certain conditions are met, as described hereinafter.

The envelope may also be qualified as "more restrictive" in that it may comprise a larger number of prohibited vertical speed-altitude pairs or comprise prohibited pairs for higher altitudes. Generally, it can be considered that the GCoP mode envelope encompasses the UPE mode envelope, as shown in FIGS. 1A and 1B mentioned hereinafter.

In order to characterize a hazardous situation, in GCoP mode, it is first established whether the aircraft is in an excessive descent phase, i.e., whether the aircraft is losing altitude rapidly. If such a descent phase is detected, several parameters, taken in isolation or in combination, may be monitored, in particular:

the position of the throttle lever on a full thrust detent,
  a parameter associated with the lever to consolidate this lever position (for example, checking whether the aircraft engines reacted correctly following the positioning of the lever on the detent),
  the absence of a runway near the aircraft, and/or
  the entry of the aircraft into a sensitive flight zone in terms of vertical speed-altitude (Vz-HAGL) monitored by the specific ground proximity detection system (which may be used to consolidate the detection of the absence of a runway).

The aforementioned parameters represent a set of conditions that can be used to characterize a non-operational, dangerous descent situation and "pre-arm" the abnormal ground approach (or approach anomaly) detection. The term "pre-arm" is used because an additional condition, described hereinafter, may be checked before it is definitively concluded that there is a ground approach anomaly.

This involves checking whether, in the aircraft's current situation, it is "authorized" to lose altitude. Said altitude loss authorization is checked in an profile associated with the aircraft, referred to hereinafter as the "delta-loss profile".

Thus, if one of the conditions relating for example to the throttle lever detent or the absence of a nearby runway is met, and if the altitude loss is not authorized, the ground approach anomaly is definitively detected and a prohibited flight envelope specific to GCoP mode is selected.

This situation may be interpreted as maximum engine thrust being maintained for a certain period that is incompatible with an approach towards an air-strip in order to land. This can therefore characterize a non-nominal, dangerous situation in which the activation of GCoP protection at low altitude becomes legitimate and worthwhile.

Another abnormal situation may be detected if the aircraft is approaching the ground and there is no runway on which to land.

Once the envelope specific to GCoP mode has been selected, as in UPE mode, protection orders may be generated to control the control surfaces of the aircraft that act on its vertical speed, these protection orders being such that, when they are applied to said control surfaces, the aircraft exits the prohibited flight envelope.

The protection orders, applied as long as the arming conditions are met and GCoP mode is active (i.e. the aircraft's vertical speed-altitude pair is within the prohibited flight envelope), make it possible to gradually reduce the descent rate of the aircraft until, for example, it is returned to a zero vertical speed, thus preventing the aircraft from descending and therefore colliding with the terrain over which it is flying (as long as the terrain does not present any particular reliefs, flat terrain).

When the conditions are no longer met, GCoP mode is deactivated and the crew regains its nominal authority, i.e. the crew's commands are taken into account again and not the commands of the protection orders.

In the present description, a distinction is made between the notions of "arming" and "activation" (or "engagement") of GCoP mode.

GCoP mode is said to be "armed" when, although the conditions are met, the aircraft is outside the prohibited flight zone. When the conditions are still met and the aircraft enters the prohibited flight envelope, the protection mode is engaged and then acts on the aircraft control surface system to bring it out of said envelope. This is known as the "engagement" (or "activation") of the protection mode.

The GCoP and UPE modes have respective flight envelopes. The envelope of GCoP mode is more restrictive as its purpose is to allow for corrective measures to be taken before UPE mode is triggered.

FIG. 1A shows a prohibited flight envelope for UPE mode.

FIG. 1A is a graph with the vertical speed of the aircraft Vz, counting positively towards the sky (in feet per minute, ft/min) on the x-axis. The altitude of the aircraft HAGL, relative to the ground (in feet), is shown on the y-axis.

The curve 10 delimits (towards the bottom of the graph) a vertical speed-altitude pair zone, for which a warning, for example audible, is emitted to the crew. This zone is used to inform the crew that imminent danger has actually been detected. The curve 11 delimits (towards the bottom of the graph) a zone contained within the aforementioned zone. When the current vertical speed and current altitude of the aircraft are in this zone, this means that it is becoming more probable (than in the zone delimited by the curve 10) that the crew must intervene. In order to attract the crew's attention further, the audible warning may for example be accompanied by a visual warning The curves 12 and 13 respectively show the maximum capacity in auto-pilot, in other words the maximum permitted load factor when the auto-pilot is engaged, and the maximum capacity in manual, in other words the maximum permitted load factor when the aircraft is being controlled manually, beyond which the structure of the aircraft will be damaged.

The zone 14 shows the prohibited flight envelope. When the aircraft is in said zone, it is highly probable that the aircraft is at risk or that it is in danger of colliding with the ground. Protection orders may then be generated and applied.

FIG. 1B shows the prohibited flight envelope for GCoP mode.

FIG. 1B is a graph similar to the one in FIG. 1A. In GCoP mode, the prohibited flight envelope 15 has a larger area in terms of vertical speed-altitude than the envelope in UPE mode shown in FIG. 1A. The envelope in FIG. 1B is thus more restricted than in FIG. 1A in that there are more prohibited vertical speed-altitude pairs for the aircraft.

GCoP mode may form an additional layer of safety in relation to UPE mode. With the conditional anomaly detection mentioned above, it is possible to take corrective measures early enough, before UPE mode is even triggered. It is probable that the aircraft will be in the GCoP envelope before it is in the UPE envelope.

GCoP mode generates protection orders under more restrictive conditions than UPE mode. However, GCoP mode has a larger envelope than UPE mode, and protection orders may thus be generated for higher altitudes than in UPE mode. This makes it possible to perform anomaly detection accompanied by the taking of corrective measures in two coexisting modes, thus increasing the safety of the aircraft.

In the rest of the description, several conditions (and sets of conditions) used to characterize a flight phase of the aircraft are described. These conditions are given as examples, and must not be understood as limitative.

A first condition may for example relate to the position of a control component of the aircraft, such as for example the throttle lever. This condition is described with reference to FIG. 2.

The condition on the control component, such as for example the throttle lever, may be used to detect an anomaly in the event that, for example, the crew of the aircraft pushes the lever to the TOGA (Take-Off Go-Around) detent, which corresponds to high engine thrust used during take-off or go-around, when the aircraft is in a descent phase.

Such a situation can pose a hazard and it may be useful to activate GCoP protection mode.

In order to enhance anomaly detection, it is possible to couple the detection of the presence of the lever on the TOGA detent with a mechanism that checks the engine's response to the lever. For example, once the lever is positioned on the TOGA detent, the variation in the engine rotation speed is monitored for a pre-determined time (parameter N1). Alternatively, or in combination, the EPR (Engine Pressure Ratio) parameter may be monitored, Thus, in FIG. 2, signals 20 and 21, which respectively represent the presence of the lever on the TOGA detent and the increase in the engine rotation speed, are given as inputs to an AND logic gate 22.

In order to further enhance anomaly detection, the current speed of the aircraft may be compared with the lowest speed that the crew can order for the aircraft. This speed is commonly known as VLS (or Lowest Selectable Speed). At low speeds (i.e. below VLS), maximum engine thrust can be a normal operational maneuver and not correspond to an anomaly.

Thus, a signal 23 representing the result of said comparison (1 if the speed is greater than VLS or 0 if it is not), is given as an input to an AND logic gate 24 with the output 25 of the gate 22.

The output of the logic gate 24 is given as the SET input to a latch 26.

Thus, when the conditions represented by signals 20, 21 and 23 are met, the latch 26 emits a signal at 1 that orders the pre-arming of GCoP mode.

To reset the latch to 0, the signal 21 representing the position of the lever on the TOGA detent is given as the input to a NOT inverter (logic gate) 27, the output of which is given as the RESET input to the latch.

Thus, if the lever detent is no longer on the TOGA position, the lock is no longer effective and the latch is reset, which results in the disarming of GCoP mode.

Figure 3:
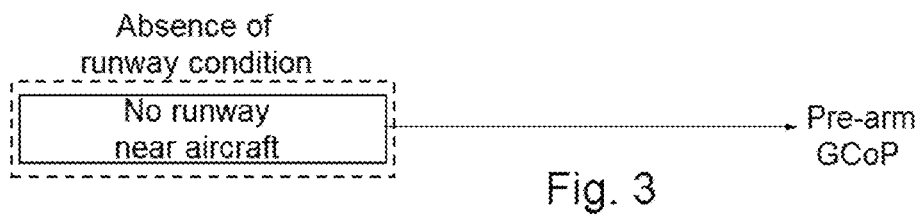

A second condition may relate to the absence of a runway near the aircraft, during a descent phase thereof. This condition is shown in FIG. 3.

Here, GCoP mode is pre-armed when, during a descent phase, the aircraft does not detect a runway within a perimeter around its position. This information may come from a runway database, for example the navigation system database (known as FMS, or Flight Management System), or the terrain proximity detection system database (known as TAWS, or Terrain Awareness and Warning System), or any other system on board the aircraft containing said information.

However, the databases used to obtain information about nearby runways are not always complete.

Figure 4:
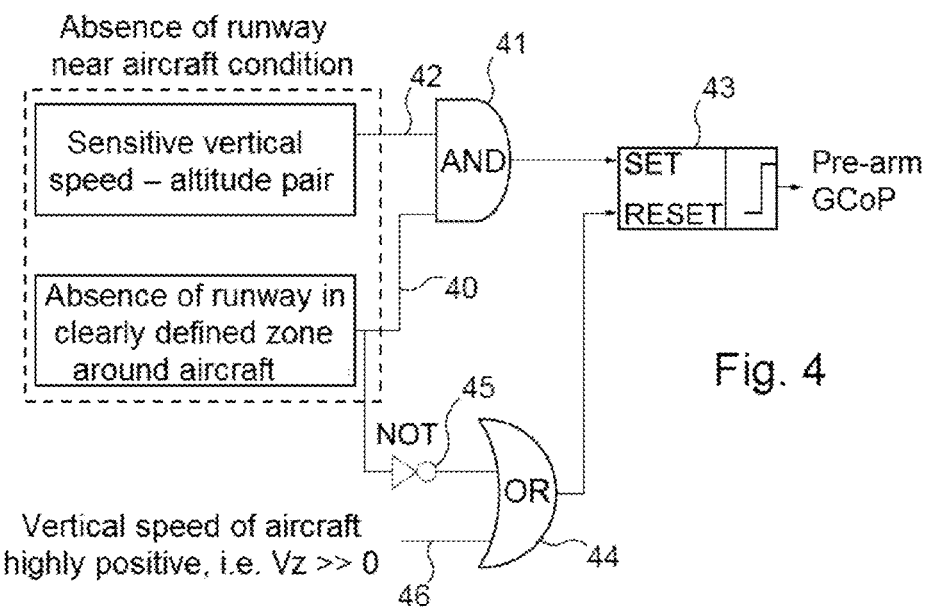

FIG. 4 shows a list of conditions to enhance the detection of the absence of a runway.

A signal 40, representing the absence of a runway near the aircraft when it is descending towards the ground, is given as the input to an AND gate 41 (when there is no runway near the aircraft, the signal 40 is 1, otherwise it is 0).

Moreover, a signal 42, representing the entry of the aircraft into a sensitive flight zone in terms of vertical speed-altitude (Vz-HAGL), for example the envelope delimited by the curve 11 in FIG. 1A, is also supplied as an input to the logic gate 41.

The output of the gate 41 is given as the SET input to a latch 43 the output of which can be used to pre-arm GCoP mode.

Thus, when the aircraft has an excessive descent rate (that is, in a situation in which the aircraft has, during a descent, at a given height relative to the ground, a vertical speed that is too fast for said height), and it is detected that there is no runway near the aircraft, GCoP mode is armed.

To reset the latch to zero, the RESET input of the latch is connected to the output of an OR logic gate 44.

This gate 44 receives as an input the signal 40 negated by a NOT inverter 45. Thus, when a runway near the aircraft is detected, the signal 40 switches to 0 then, under the action of the inverter, the RESET input to the latch switches to 1 and the latch is reset, i.e. its output no longer orders the pre-arming of the protection mode.

The gate 44 also receives a signal 46 that is 1 when the vertical speed of the aircraft becomes positive again, i.e. the aircraft exits a descent phase and starts to ascend again.

The pre-arming of GCoP protection as described with reference to FIG. 4 makes it possible to make the absence of runway near the aircraft criterion even more reliable.

Figure 5:
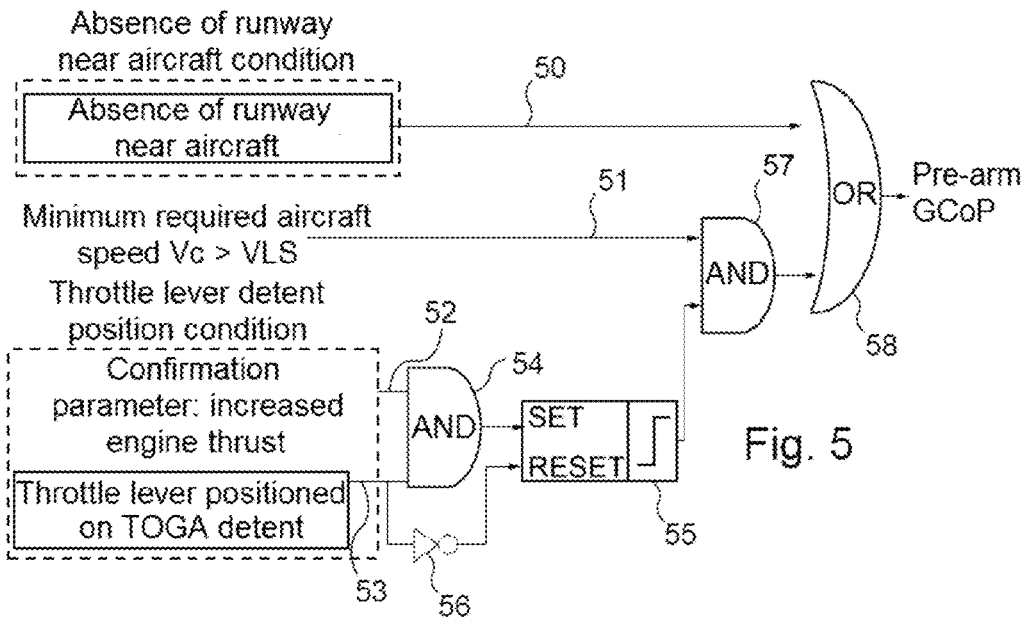

Another set of conditions to be met to pre-arm GCoP protection mode is described with reference to FIG. 5.

This set of conditions uses the conditions relating to the absence of a runway near the aircraft (signal 50), the speed of the aircraft above the minimum speed VLS that can be ordered by the crew (signal 51), the confirmation of the increase in engine thrust (signal 52) and the position of the lever on the TOGA detent (signal 53) already mentioned above.

The signals 52 and 53 are input data to an AND logic gate 54 the output of which is connected to the SET input of a latch 55. The RESET input of the latch is connected to the output of an inverter 56 that receives the signal 53.

The output of the latch and the signal 51 are given as the input to an AND logic gate 57. The output of the logic gate 57 and the signal 50 are given as the input to an OR logic gate 58. The output of the gate 58 is used to pre-arm or not pre-arm GCoP protection mode.

The set of conditions described above with reference to FIG. 5 can be seen as a combination of those described with reference to FIGS. 2 and 3.

Figure 6:
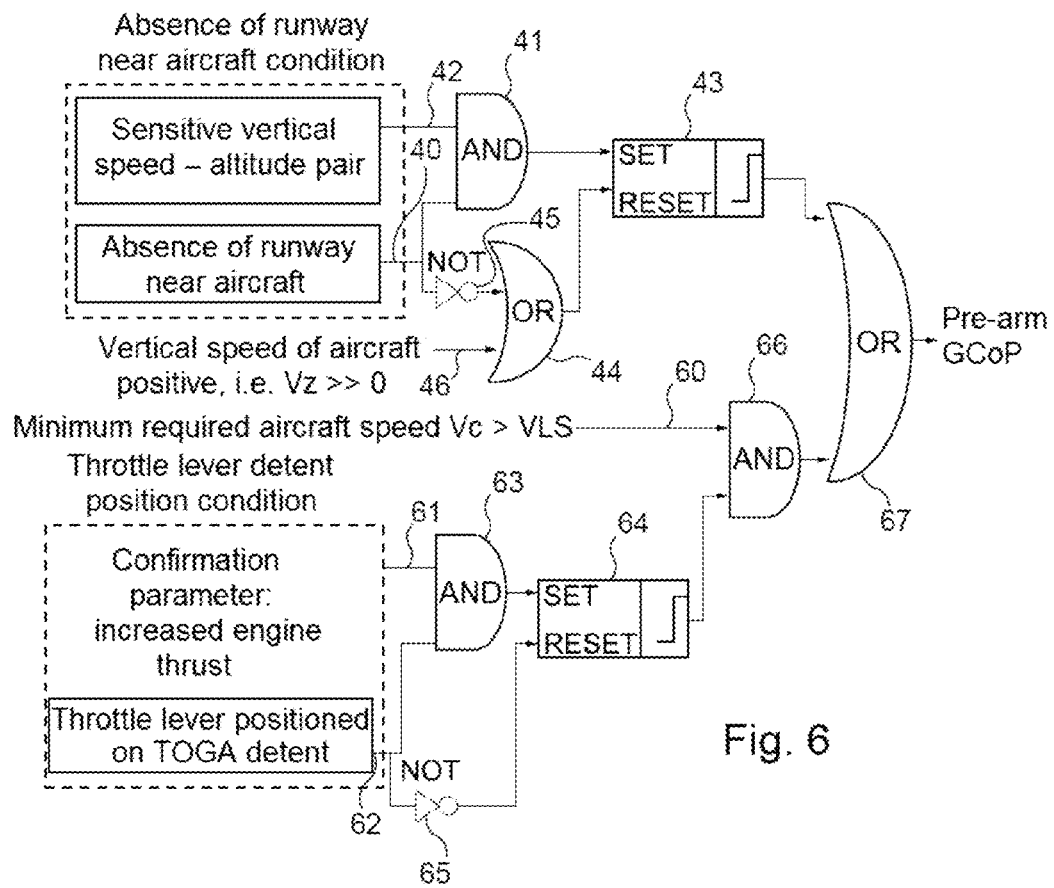

FIG. 6 shows a set of conditions that can be seen as a combination of the conditions described with reference to FIGS. 2 and 4.

The components 40 to 46 in FIG. 4 are shown again in FIG. 6.

Furthermore, the conditions relating to the speed of the aircraft above the minimum speed VLS that can be ordered by the crew (signal 60), the confirmation of the increase in engine thrust (signal 61) and the position of the lever on the TOGA detent (signal 62) already mentioned above are used.

The signals 61 and 62, which respectively represent the presence of the lever on the TOGA detent and the increase in the engine rotation speed, are given as inputs to an AND logic gate 63 the output of which is connected to the SET input of a latch 64. The RESET input of the latch is connected to the output of an inverter 65 that receives the signal 62.

The output of the latch 64 and the signal 60 representing the result of said comparison (1 if the speed is greater than VLS or 0 if it is not), are given as an input to an AND logic gate 66.

The output of the logic gate 66 and the output of the latch 43 are given as inputs to an OR logic gate 67. Finally, the output of the gate 67 is used to arm or not arm GCoP protection mode.

Figure 7:
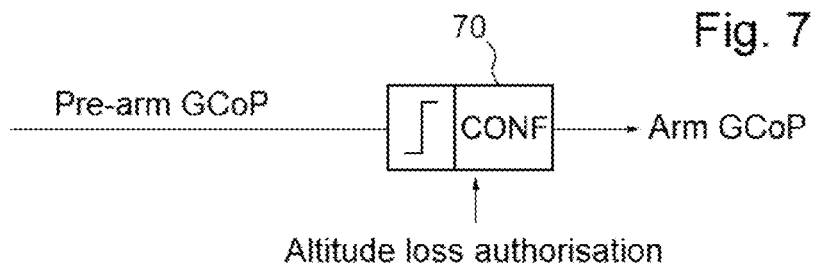

FIG. 7 shows an altitude loss authorization condition that may supplement the conditions already mentioned above. In particular, this condition may be inserted once the pre-arming signal has been generated (as an output from components 26, 43, 58, 67 for example) in order to arm GCoP mode.

It involves a confirmation module 70 that receives the pre-arming signal as an input and, as a function of an altitude loss authorization, emits a signal for the definitive arming of the protection mode.

The altitude loss authorization may be used to delay the triggering (or arming) of the protection mode, for example to enable the crew to rectify the situation of the aircraft itself (perform an evasive downwards or other maneuver) or to perform a turn-around. The altitude loss authorization may come from an altitude loss profile shown in FIG. 8.

Figure 8:
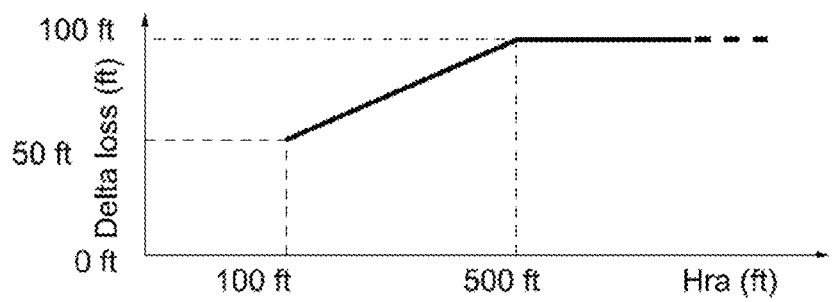
FIG. 8 shows an altitude loss authorization profile.

FIG. 8 is a graph with the altitude of the aircraft HRA (in feet, ft) on the x-axis and the altitude loss ("delta loss") authorized for the aircraft (in feet, ft) on the y-axis If the vertical speed of the aircraft is negative and the protection mode pre-arming conditions are met, the altitude HRA from which the vertical speed of the aircraft became negative is determined. The corresponding altitude loss in the profile is then determined (for example by reading a table containing the profile) and if the aircraft loses more altitude than authorized, the protection mode is armed (generation of protection orders and application of these orders).

Thus, for example, when the aircraft is 100 feet above the ground and the pre-arming signal is active, the system waits for the aircraft to lose 50 feet before the protection mode is armed. In the event that the pre-arming conditions are met above 500 feet, the authorized altitude loss is 100 feet whatever the height HRA. The values above are given for the purposes of illustration only.

When the protection mode is armed, a prohibited flight envelope is determined. This defines the vertical speed (Vz in feet per minute) and altitude relative to the ground (HRA in feet) pairs not authorized for the aircraft. From the moment when the aircraft enters this "conditional prohibited" flight envelope, it follows a descent profile corresponding to the profile of said prohibited flight envelope.

Protection orders are generated to control the control surfaces of the aircraft that act on its vertical speed, these protection orders being such that, when they are applied to the control surfaces, the aircraft avoids being in the prohibited flight envelope.

Figure 9:
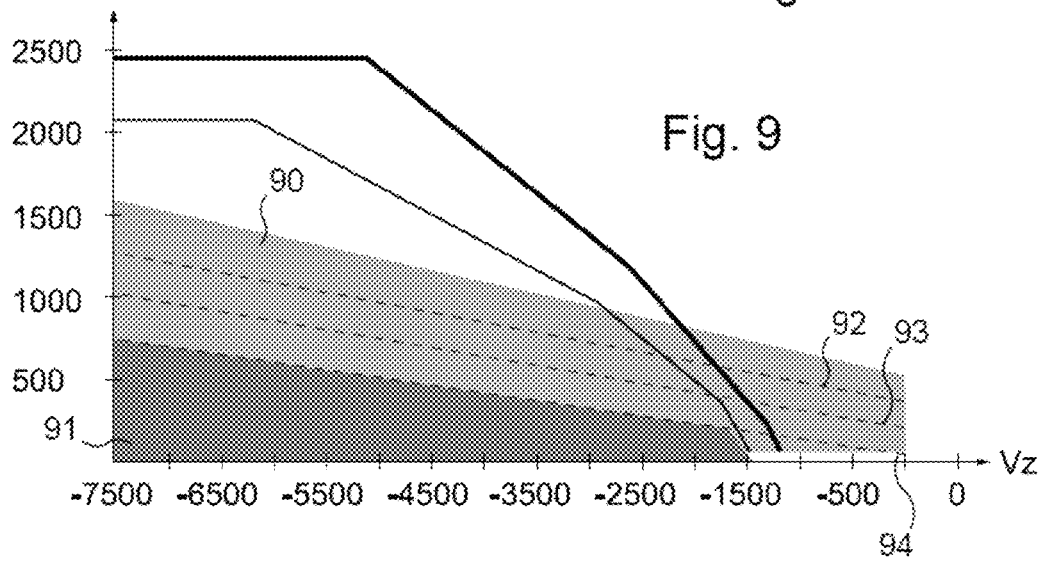
FIG. 9 shows descent profiles to generate protection orders.

The orders can be generated on the basis of descent profiles as shown in FIG. 9.

The zone 90 represents the prohibited flight envelope in GCoP mode, the zone 91 represents the prohibited flight envelope for UPE mode and the curves 92, 93 and 94 represent descent profiles that enable the aircraft to gradually reduce its vertical speed (as an absolute value) during descent.

The profiles comply with the maximum capacity in manual, in other words the maximum permitted load factor when the aircraft is being controlled manually, beyond which the structure of the aircraft will be damaged. The profile used depends on the point (Vz, HRA) from which GCoP mode is armed.

With regard to the altitude HRA that defines the boundaries of the prohibited flight envelope for GCoP mode, the maximum altitude HRA for a zero vertical speed is set at 500 feet (as mentioned above, said altitude at Vz zero may vary as a function of the Vz/HRA point at which the GCoP mode arming conditions are met). The prohibited flight envelope then occupies the area Vz/HRA from the previously defined point, i.e. 500 feet at Vz zero, to an altitude of 2,000 feet at a Vz of −12,000 ft/min.

In order to generate a protection order, a vertical acceleration value γZ is determined by the following formula:

$$\gamma Z = (Vz^2 - V\max^2)/2h$$

where:

Vz is said measured current vertical speed of the aircraft;

Vmax is the maximum permitted vertical speed at the current height according to the prohibited flight envelope; and h is the measured current altitude.

The protection order generated then corresponds to one or more control surface deflection angle commands enabling the vertical acceleration calculated in this way to be reached.

When a protection order is generated, it may not be applied immediately.

Its application may be subject to a decision-making mechanism as described hereinafter.

Figure 10:
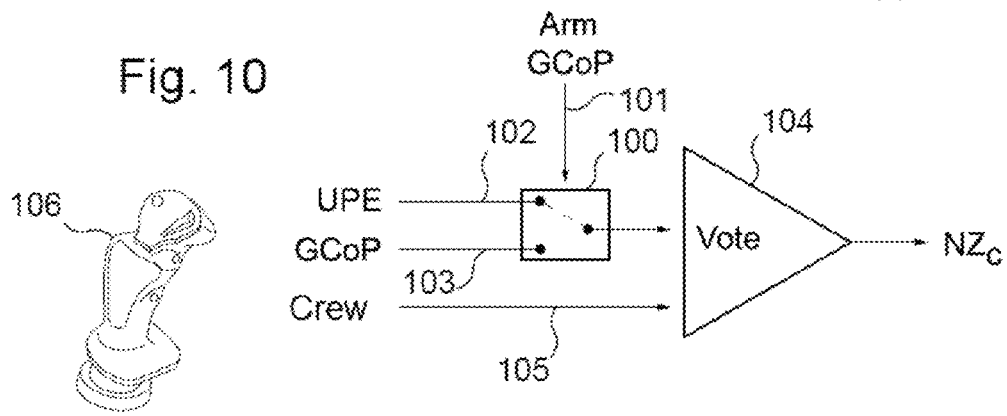
FIG. 10 shows the decision-making principle for the application of the protection orders generated.

In particular, a decision may be made to choose between the application of the order generated and the application of an order given by the crew. Such selection is shown in FIG. 10.

A protection mode selection module 100 receives as an input a selection signal 101, to select a protection mode (UPE or GCoP). For example, the UPE mode is a default mode, and the signal 101 activates the GCoP mode. The signal 101 is for example an arming signal as generated by the module 70 shown in FIG. 7.

Thus, depending on the mode selected, an order generated in UPE mode represented by a signal 102, or an order generated by GCoP mode, represented by a signal 103, will be delivered by the protection selection module 100.

However, before the order delivered by the module 100 is actually applied, it will be subject to selection by a voting module 104 with the task of choosing between the application of the order given by the module 100 or an order given by the crew, represented by a signal 105. For example, the order comes from a command on the throttle lever 106.

In the event that the aircraft has a high vertical descent rate at low altitude and the conditions for GCoP protection mode are not met, GCoP mode is not active. The voting module then receives two protection orders, one being the UPE mode protection order and the other being the order from the crew (for example following action by the pilot on the lever).

To make the choice of which order to apply, the voting module may apply decision-making criteria such as for example the order that aims to bring the nose of the aircraft up the most. Thus, the order that results in the nose of aircraft being brought up the most is selected as taking priority by the voting module, and this order is applied.

In the event that the GCoP mode conditions are met, the choice of which order to apply is between the order from the GCoP system and the order from the crew. To make the choice, the voting module may use the same criterion as above.

When a protection order is generated, it may not be applied. Its application may be inhibited by a mechanism ensuring that the crew can maneuver the aircraft in specific situations in which the crew must not be hindered by automatically generated orders.

To cancel a generated protection order, several criteria must be taken into account, in particular:

the AEI (All Engines Inoperative) parameter, the TEFO (Total Engine Flame Out) parameter, an inconsistency between radio altimeters 1 and 2 of the aircraft, in other words, incorrect measurements sent by one or other of the aircraft's on-board measuring instruments providing information about altitude (HRA, in feet), the NCD (No Computed Data) parameter of a radio altimeter, i.e. a radio altimeter operating outside the range within which it is supposed to function and unable to give the aircraft information about its current altitude, a loss of normal law (in the event that on-board flight control protection systems on the aircraft are inoperative), the presence of a runway near the aircraft; as long as there is a runway near the aircraft, the aircraft cannot be prevented from landing even if the situation is characterized as abnormal, and the loss of the TAWS (Terrain Awareness Warning System), particularly when GCoP mode relies on said system.

Figure 11:
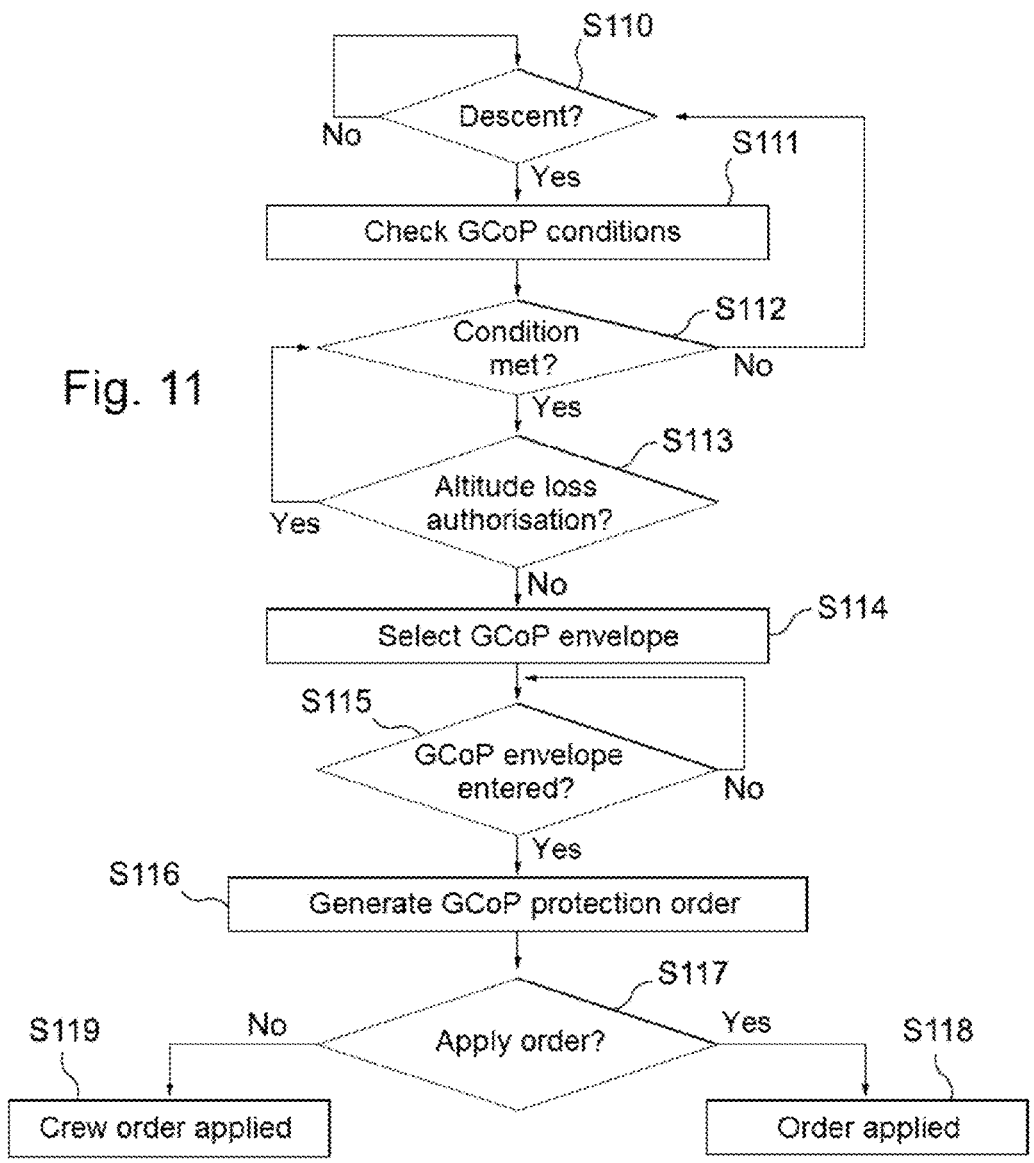
FIG. 11 is a flow chart of the steps in a method according to one embodiment.

FIG. 11 is a flow chart of steps in a method for the detection of aircraft descent anomaly according to embodiments of the invention. This method may for example be implemented by a system for the detection of aircraft descent anomaly.

During a step S110, it is determined whether the aircraft has commenced a descent. A descent speed threshold may be used for this determination.

If the aircraft is descending (YES), i.e. it is rapidly losing altitude in relation to the ground, one or more of the conditions described above are checked in step S111.

During step S112, it is determined whether at least one of the conditions is met. If not (NO), the method returns to step S110.

Otherwise, during step S113 it is determined whether or not the aircraft is authorized to lose altitude, an additional condition already mentioned above.

If the aircraft is authorized to lose altitude (YES), the method returns to step S112. If not (NO), a GCoP prohibited flight envelope is selected during step S114. For example, as already mentioned above, UPE mode is active by default. Thus, the current vertical speed-current altitude pair of the aircraft is already monitored, but in relation to a prohibited flight envelope specific to UPE mode (with a smaller area than the GCoP mode envelope). The selection of the GCoP mode prohibited flight envelope may in this case consist of no longer taking into account the UPE mode envelope and taking into account the envelope specific to GCoP mode from that time on.

Once the envelope has been selected, it is determined whether the aircraft has entered the envelope in question. It is checked whether the current vertical speed-altitude pair of the aircraft falls within the envelope.

If not (NO), the method continues to compare the current pair to the envelope; otherwise (YES), a protection order is generated during step S116. As Then, during step S117, it is determined whether the order generated must be applied. For example, a choice is made between this generated order and an order given by the crew. This mechanism has already been mentioned above.

If the decision is made to apply the order generated (YES), it is applied during step S118; otherwise (NO) the order from the crew is applied during step S119.

A computer program to implement a method according to an embodiment of the invention may be produced by a person skilled in the art on reading the flow chart in FIG. 11 and the present detailed description.

Figure 12:
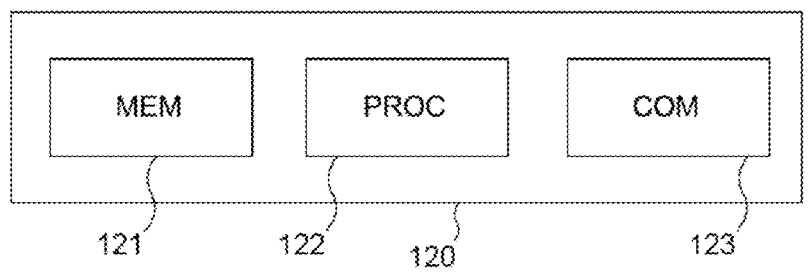
FIG. 12 is a diagrammatic illustration of a system according to one embodiment.

FIG. 12 shows a system for the detection of aircraft descent anomaly according to embodiments of the invention. The system 120 comprises a storage unit 121 (MEM). Said storage unit comprises a random-access memory for the non-durable storage of the calculation data used during the implementation of a method according to an embodiment of the invention. The storage unit also comprises a non-volatile memory (such as EEPROM, for example) to store for example a computer program according to an embodiment of the invention for the execution thereof by a processor (not shown) of a processing unit 122 (PROC) of the system. The memory may also store one or more prohibited flight envelopes, altitude loss authorization profiles, landing runway maps, conditions to be checked or other, depending on the embodiment.

The system also comprises a communication unit 123 (COM) for implementing communications, for example to communicate with landing runway location or other databases.

Of course, the present invention is not limited to the embodiments described, and other variants and combinations of features are possible. The description of a feature in one embodiment does not exclude the possibility of this feature being used in another embodiment. Other variants and embodiments may be deduced and implemented by a person skilled in the art on reading the present description and the attached figures.

In the claims, the term "comprise" does not exclude other components or steps. The indefinite article "a" does not exclude the plural. A single processor or several other units may be used to implement the invention. The various features presented and/or claimed may be combined advantageously. Their presence in the description or in various dependent claims does not exclude this possibility. The reference signs may not be understood as limiting the scope of the invention.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for the detection of aircraft descent anomaly, comprising the steps:
    characterizing, by an aircraft descent anomaly detection system, a flight phase of the aircraft wherein the aircraft descent anomaly detection system includes a processor, electronic circuit, and voting module, said characterization comprising at least one of:
        position data that is based on the position of a throttle lever of the aircraft;
        variation thrust data that is based on a parameter for a variation of a thrust over a period of time of the aircraft;
        speed data that is based on determining that a current speed of the aircraft is above a minimum speed control threshold;
    determining, by the processor, a prohibited flight envelope,
    defining, by the processor, a set of prohibited vertical speeds of the aircraft for given altitudes, as a function of the flight phase of the aircraft characterized, and
    detecting, by the processor, a descent anomaly of the aircraft as a function of a current vertical speed and altitude of the aircraft, in relation to the prohibited flight envelope determined;
    generating, by the processor, an aircraft protection order in response to the anomaly detected and based on the position data, variation thrust data and speed data;
    receiving, by the voting module, both the aircraft protection order and a crew altitude control order;
    selecting, by the voting module, an applied protection order that is at least one of the aircraft protection order and the crew altitude control order based on a decision-making criteria;
    applying, by the aircraft descent anomaly detection system, the applied protection order.

2. The method according to claim 1, in which the detection of the aircraft descent anomaly by the aircraft is dependent on an authorization to reduce the altitude of the aircraft.

3. The method according to claim 1, in which the prohibited flight envelope determined corresponds to an envelope, the area of which in terms of aircraft vertical speed-altitude is larger than that of a nominal prohibited flight envelope.

4. The method according to claim 1, in which the applied protection order is applied to control surfaces of the aircraft.

5. The method according to claim 1, wherein the decision-making criteria includes determining whether the aircraft protection order and crew altitude control order improves the aircraft in avoiding the prohibited flight envelope.

6. The method according to claim 1, in which the selection step further comprises the selection of an order from at least the aircraft protection order generated and the crew altitude control order issued by an attitude control component of the aircraft.

7. The method according to claim 1, also comprising a step of inhibiting, by the voting module, the application of an order generated as a function of the flight phase of the aircraft determined.

8. A system for detection of aircraft descent anomaly, comprising:
   an electronic circuit configured to receive:
      position data that is based on the position of a throttle lever of the aircraft;
      variation thrust data that is based on a parameter for a variation of a thrust over a period of time of the aircraft;
      speed data that is based on determining that a current speed of the aircraft is above a minimum speed control threshold;
   a processor configured to:
      determine a prohibited flight envelope,
      define a set of prohibited vertical speeds of the aircraft for given altitudes, as a function of the flight phase of the aircraft characterized, and
      detect a descent anomaly of the aircraft as a function of a current vertical speed and altitude of the aircraft, in relation to the prohibited flight envelope determined;
      generate an aircraft protection order in response to the anomaly detected and based on the position data, variation thrust data and speed data;
   a voting module configured to:
      receive the aircraft protection order and a crew altitude control order;
      select an applied protection order that is at least one of the aircraft protection order and a crew altitude control order based on a decision-making criteria
   wherein the system for detection of aircraft descent anomaly is configured to apply the applied protection order.

9. A method for the detection of an aircraft descent anomaly, comprising:
   determining, by a processor, whether an aircraft has commenced a descent;
   determining, by the processor, that one or more Ground Collision Protection (GCoP) conditions are satisfied;
   determining, by the processor, that the aircraft is not authorized to lose altitude;
   selecting, by the processor, a prohibited flight envelope;
   determining, by the processor; that the aircraft has entered the prohibited flight envelope;
   generating, by the processor, an aircraft protection order;
   receiving, by a voting module, the aircraft protection order and a crew altitude control order;
   selecting, by the voting module, an applied protection order that is at least one of the aircraft protection order and a crew altitude control order based on a decision-making criteria;
   applying, by a system for detection of aircraft descent anomaly, the applied protection order;
   wherein the system for detection of aircraft descent anomaly includes the processor and voting module.

* * * * *